(12) United States Patent
Takei

(10) Patent No.: US 11,081,811 B2
(45) Date of Patent: Aug. 3, 2021

(54) TRANSMITTER

(71) Applicant: Hitachi, Ltd., Tokyo (JP)

(72) Inventor: Ken Takei, Tokyo (JP)

(73) Assignee: HITACHI, LTD., Tokyo (JP)

( * ) Notice: Subject to any disclaimer, the term of this patent is extended or adjusted under 35 U.S.C. 154(b) by 89 days.

(21) Appl. No.: 16/530,307

(22) Filed: Aug. 2, 2019

(65) Prior Publication Data

US 2020/0067204 A1 Feb. 27, 2020

(30) Foreign Application Priority Data

Aug. 21, 2018 (JP) .............................. JP2018-154458

(51) Int. Cl.
| | | |
|---|---|---|
| *H01Q 21/24* | (2006.01) | |
| *H04B 7/10* | (2017.01) | |
| *H01Q 19/20* | (2006.01) | |
| *H01Q 15/24* | (2006.01) | |
| *H01Q 9/04* | (2006.01) | |

(52) U.S. Cl.
CPC ........... *H01Q 21/24* (2013.01); *H01Q 9/0428* (2013.01); *H01Q 15/244* (2013.01); *H01Q 19/20* (2013.01)

(58) Field of Classification Search
CPC ...... H01Q 21/24; H01Q 21/245; H01Q 19/20; H01Q 15/24; H01Q 15/244; H04B 1/005; H04B 1/38; H04B 7/0469; H04B 7/10
See application file for complete search history.

(56) References Cited

U.S. PATENT DOCUMENTS

| | | | | |
|---|---|---|---|---|
| 2007/0184785 A1* | 8/2007 | Yoshida | ................... | H04B 7/10 455/73 |
| 2013/0336417 A1* | 12/2013 | Takei | ................... | H04B 7/0894 375/267 |
| 2016/0182185 A1* | 6/2016 | Takei | ....................... | H04L 5/04 455/42 |
| 2017/0062951 A1* | 3/2017 | Takei | ..................... | H04L 7/041 |
| 2017/0310379 A1* | 10/2017 | Takei | ................... | H04W 56/001 |
| 2018/0262260 A1* | 9/2018 | Takei | ................... | H04J 13/0003 |

FOREIGN PATENT DOCUMENTS

WO WO2012/120657 A1 9/2012

OTHER PUBLICATIONS

Extended European Search Report issued in corresponding European Application No. 19186969.2 dated Nov. 28, 2019, ten (10) pages.

* cited by examiner

*Primary Examiner* — Thai Pham

(74) *Attorney, Agent, or Firm* — Foley & Lardner LLP

(57) ABSTRACT

A controller of a transmitter outputs cyclically different digital data to equivalent transmission circuits, that is, RF circuits to generate a rotation polarized wave.

20 Claims, 11 Drawing Sheets

TRANSMITTER

BACKGROUND

The present invention relates to a transmitter.

In view of the recent situation that the concept "Internet of Things (IoT)" has been increasingly attracting attention, much effort for technical development aiming at implementation of the IoT has been made in various ways.

The IoT is designed to link many devices to the internet, collect signals relating to conditions of the devices so as to deliver signals for controlling such devices based on contents of the signals, and achieve highly efficient operations of various systems constituted by those devices.

In order to implement the IoT, it is necessary to link many sensors for monitoring the device information, and actuators which control operations of the devices to the control network. It is therefore preferable to construct the control network via wireless communication requiring no cable from the aspect of cost reduction of the hardware installment.

In order to link the control network to the sensors and the actuators wirelessly, it is necessary to use a wireless device equipped with a transmitter and a receiver. In this case, inconsistency between the antenna of the receiver and polarized wave of the incoming wave may deteriorate quality of the reception signal. If the environment surrounding the transmitter-receiver fluctuates, the polarized wave of the incoming wave dynamically changes as well. It is therefore difficult for the receiver to maintain good communication quality.

International Publication WO 2012/120657 (Japanese Patent Application No. 2013-503288) discloses a technique for solving the problem of deterioration in quality of the reception signal owing to the inconsistent polarized wave by allowing the transmitter-receiver to selectively use the optimal polarized wave.

Specifically, in the above-described publication, the transmitter is configured to rotate the polarized wave at low frequency that is different from the propagation frequency for superposition of the signal so as to be transmitted. The receiver is configured to receive different polarized wave of the incoming wave having the rotating polarized wave at time intervals at different time points so that the polarized wave with good signal quality is selected.

SUMMARY

The process for generating the rotation polarized wave as disclosed in the publication is unique, which is hardly derived from the general wireless technology. Specifically, the process employs the circuit configured to use a transmission device for generating the carrier frequency, and a transmission device with frequency different from two carrier frequencies orthogonal to each other for rotating the polarized wave.

In order to commercialize the above-described structure, it is necessary to develop the new semiconductor chip, or design and manufacture the new module formed of integrated discrete components. Accordingly, it is difficult to implement the transmitter of the rotation polarized wave at low costs.

Especially if the wireless communication system requires many transmitters of the rotation polarized waves for wirelessly collecting data of many sensors, for example, the number of the transmitters of the rotation polarized waves becomes in the same order as the number of the sensors. Therefore, the transmitter of the rotation polarized wave is required to be implemented at low costs.

It is an object of the present invention to provide the transmitter of the rotation polarized wave at low costs.

The transmitter according to an aspect of the present invention includes a first transmission circuit and a second transmission circuit having at least one common circuit, and a controller which generates first digital data and outputs the first digital data to the first transmission circuit, and generates second digital data different from the first digital data and outputs the second digital data to the second transmission circuit. Outputs of the first transmission circuit and the second transmission circuit are transmitted from a pair of antennas spatially orthogonal to each other to generate a radio wave having a polarized wave rotating orthogonally to a propagation direction.

According to the embodiment of the present invention, the transmitter of the rotation polarized wave may be realized at low costs.

DETAILED DESCRIPTION

Figure 1:
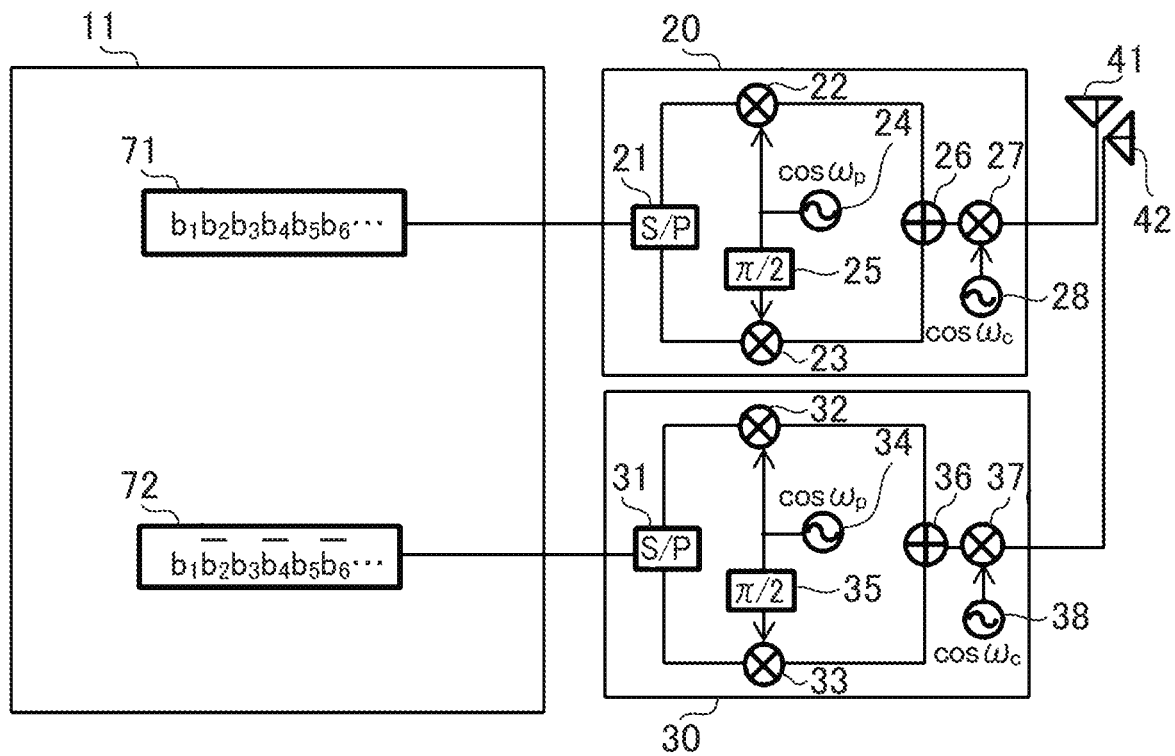
FIG. 1 is a view showing a structure of a transmitter according to a first embodiment.

Embodiments will be described referring to the drawings.

First Embodiment

A structure of a transmitter according to a first embodiment will be described referring to FIG. 1.

As FIG. 1 shows, a transmitter 101 includes RF circuits 20 and 30, and a controller 11. The controller 11 includes a first bit string generator 71 for generating a first bit string, and a second bit string generator 72 for generating a second bit string. Digital outputs from the generators are input to the RF circuits 20 and 30, respectively.

The digital signal input to the RF circuit 20 is processed by a 2-bit first serial-parallel converter 21 while having an odd bit input to a first multiplier 22. The input is multiplied by an output of a first modulation frequency generator 24 so as to be input to a first combiner 26. An even bit is input to a second multiplier 23, and multiplied by an output of the modulation frequency generator 24 via a 90-degree phase shifter 25 so as to be further input to the first combiner 26. A first mixer 27 up-converts the output of the combiner 26 with an output of a first carrier frequency generation circuit 28, which will be radiated to space by a first antenna 41.

The digital signal input to the RF circuit 30 is processed by a 2-bit second serial-parallel converter 31 while having an odd bit input to a third multiplier 32. The input is multiplied by an output of a second modulation frequency generator 34 so as to be input to a second combiner 36. An even bit is input to a fourth multiplier 33, and multiplied by an output of the modulation frequency generator 34 via a second 90-degree phase shifter 35 so as to be further input to the second combiner 36.

A second mixer 37 up-converts the output of the second combiner 36 with an output of a second carrier frequency generation circuit 38, which will be radiated to air by a second antenna 42 spatially orthogonal to the first antenna 41. The first carrier frequency generation circuit 28 is equivalent to the second carrier frequency generation circuit 38. The first modulation frequency generation circuit 24 is equivalent to the second modulation frequency generation circuit 34.

The rotation polarized wave is generated by dividing an output of a bit string generator which is equivalent to the first bit string generator 71 into two branches. The branch with one of the polarized wave rotation frequencies is modulated with a cosine wave, and the other is modulated with a sine wave. The modulated outputs are up-converted with the carrier frequency, and radiated to air from the two different antennas which are spatially orthogonal to each other.

The first bit string generator 71 and a second bit string generator 72 generate bit streams having the same odd bits and different (inverted) even bits to be simultaneously (synchronously) output to the RF circuits 20 and 30, respectively.

The first serial-parallel converter 21 and the second serial-parallel converter 31 allow the first multiplier 22 and the third multiplier 32 to superpose the odd bits of the output from the first bit string generator 71 and the second bit string generator 72 with the cosine wave corresponding to the single cycle of the polarized wave rotation frequency. The even bit is superposed with the sine wave corresponding to the single cycle of the polarized wave rotation frequency by the second multiplier 23 and the fourth multiplier 33. Outputs of the first multiplier 22 and the second multiplier 23 are synthesized, and up-converted into the carrier frequency by the first mixer 27, which is radiated to air by the first antenna 41. Outputs of the third multiplier 32 and the fourth multiplier 33 are synthesized, and up-converted into the carrier frequency by the second mixer 37, which is radiated to air by the second antenna 42.

In both the RF circuits, each signal before up-conversion is formed as a synthesis of the sine and the cosine waves of the polarized wave rotation frequency. Those signals are the same except the code of the sine wave ($\sin \omega_p$) which is kept constantly different. Outputs of the first combiner 26 and the second combiner 36 are orthogonal to each other with respect to all possible 2-bit combinations as shown in FIG. 13A.

Figure 13A:
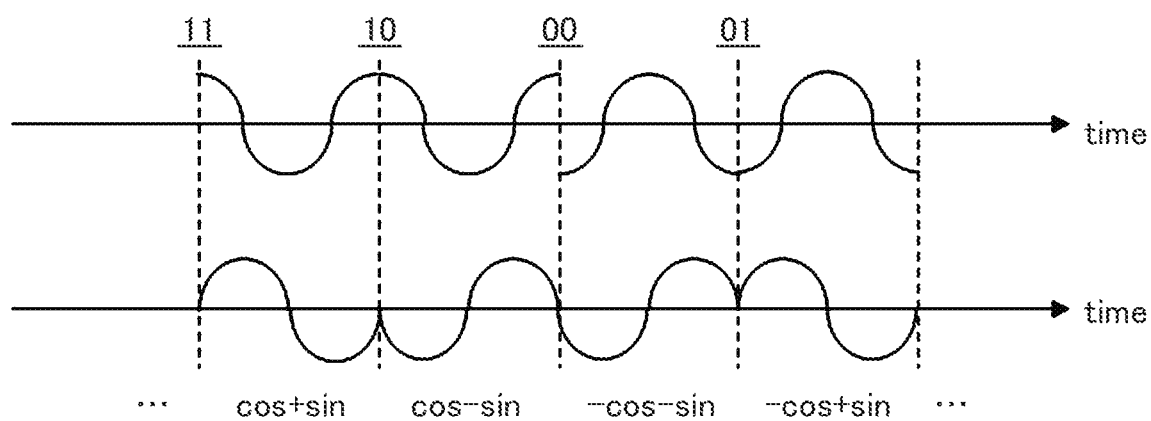
FIG. 13A is an explanatory view of a principle of generating a rotation polarized wave using QPSK modulation.

An upper waveform of FIG. 13A represents the waveform of the cosine wave to be superposed with the odd bit, and a lower waveform represents the waveform of the sine wave to be superposed with the even bit. The relationship between those waveforms may be expressed by the following numerical expressions.

$$\cos \omega pt + \sin \omega pt / \cos \omega pt - \sin \omega pt, \cos \omega pt - \sin \omega pt /$$
$$\cos \omega pt + \sin \omega pt, -\cos \omega pt - \sin \omega pt / -\cos \omega pt + \sin$$
$$\omega pt, -\cos \omega pt + \sin \omega pt / -\cos \omega pt - \sin \omega pt \quad \text{(Numerical expression 1)}$$

$$\sqrt{2} \cos [\omega pt - 0.25\Pi] / \sqrt{2} \sin [\omega pt - 0.25\Pi], \sqrt{2} \sin$$
$$[\omega pt - 0.25\Pi] / \sqrt{2} \cos [\omega pt - 0.25\Pi], -\sqrt{2} \cos$$
$$[\omega pt - 0.25/\Pi] / -\sqrt{2} \sin [\omega pt - 0.25\Pi], -\sqrt{2} \sin$$
$$[\omega pt - 0.25\Pi] / -\sqrt{2} \cos [\omega pt - 0.25\Pi] \quad \text{(Numerical expression 2)}$$

Numerical expressions before and after the slash "/" denote the outputs from the first combiner 26 and the second combiner 36, respectively.

As the numerical expressions 1 and 2 indicate, the signals radiated to air from the two antennas which are spatially orthogonal to each other serve to branch the output of the bit string generator equivalent to the first bit string generator 71 into two. In the respective branches, one of the polarized wave rotation frequency is modulated with the cosine wave, and the other is modulated with the sine wave. The modulated outputs are up-converted with the carrier frequency to generate the rotation polarized wave.

The transmitter 101 according to the first embodiment includes the first transmission circuit (RF circuit 20) and the second transmission circuit (RF circuit 30) each having at least one common circuit, and the controller 11 configured to generate first digital data (first bit string generated by the first bit string generator 71) so as to be output to the first transmission circuit (RF circuit 20), and to generate second digital data (second bit string generated by the second bit string generator 72) which are different from the first digital data so as to be output to the second transmission circuit (RF circuit 30).

The transmitter transmits the output of the first transmission circuit (RF circuit 20) and the output of the second transmission circuit (RF circuit 30) from the pair of antennas (41, 42) which are spatially orthogonal to each other so as to generate radio wave having the polarized wave rotating orthogonally to the propagation direction.

The first transmission circuit (RF circuit 20) and the second transmission circuit (RF circuit 30) include the common circuits, for example, the same modulators (21 to 26 in FIG. 1), and the same frequency up-converters (27, 28 in FIG. 1).

The controller 11 generates digital data (71, 72 in FIG. 1) as second digital data having a part cyclically different from the first digital data. For example, the controller 11 generates the digital data (71, 72 in FIG. 1) as the second digital data having a part different from the first digital data, and the same part as the first digital data, which are cyclically equivalent with respect to time. Specifically, the controller 11 generates the first digital data and the second digital data (71, 72 in FIG. 1) each having the sequential bit string constituted by the coincident bits and the inverted bits alternately and repeatedly arranged in every other bit.

The controller 11 simultaneously outputs the first digital data and the second digital data to the first transmission circuit (RF circuit 20) and the second transmission circuit (RF circuit 30), respectively.

As described above, the transmitter 101 according to the first embodiment is configured to input different digital data (71, 72 in FIG. 1) to a pair of equivalent transmission circuits (20, 30 in FIG. 1) provided with the modulators (21 to 26 in FIG. 1), and the frequency up-converters (27, 28 in FIG. 1), transmit outputs of the respective transmission circuits from the pair of antennas (41, 42 in FIG. 1) which are spatially orthogonal to each other, and generate the radio wave having the polarized wave rotating orthogonally to the propagation direction. In this case, the modulator (21 to 26 in FIG. 1) executes QPSK modulation (see FIG. 13A), or offset QPSK modulation (see FIG. 13B).

In the first embodiment, a pair of commercial RF chips or wireless modules for the general wireless system using QPSK modulation are employed to simultaneously input different bit strings to the respective modules from the commercial controller so that the rotation polarized wave is radiated. This makes it possible to provide the transmitter of the rotation polarized wave at lower costs.

Second Embodiment

A structure of a transmitter according to a second embodiment will be described referring to FIG. 2.

Figure 2:
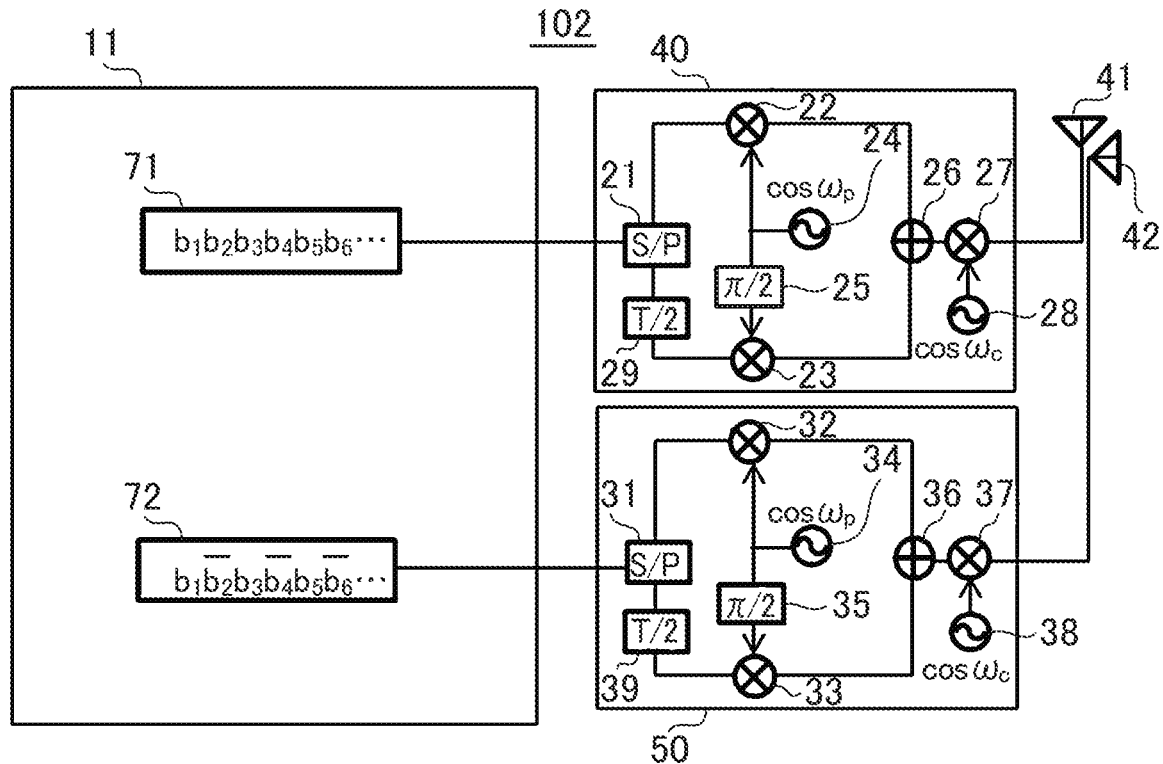
FIG. 2 is a view showing a structure of a transmitter according to a second embodiment.

As FIG. 2 shows, a transmitter 102 includes RF circuits 40 and 50, and the controller 11. Compared with the RF circuits 20 and 30 according to the first embodiment, in the RF circuits 40 and 50 of this embodiment as shown in FIG. 2, a first half-bit phase delay unit 29 is inserted between the first serial-parallel converter 21 and the second multiplier 23, and a second half-bit phase delay unit 39 is inserted between the second serial-parallel converter 31 and the fourthmultiplier 33. Those half-bit phase delay units allow the RF circuits 40 and 50 to execute the offset QPSK modulation.

Figure 13B:
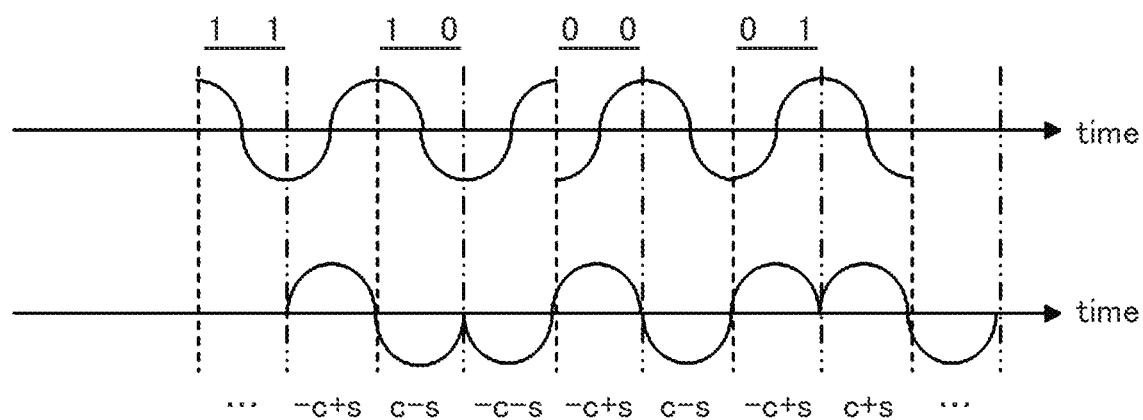
FIG. 13B is an explanatory view of a principle of generating a rotation polarized wave using offset QPSK modulation.

Referring to FIG. 13B, the operation according to the embodiment as shown in FIG. 2 is different from the one as shown in FIG. 13A. That is, the cosine wave to be superposed with the odd bit is shifted from the sine wave to be superposed with the even bit by half cycle. However, this clearly shows that the cosine wave and the sine wave are orthogonal to each other by each half-cycle of the polarized wave rotation. Therefore, outputs of the combiners 26 and 36 of the respective RF circuits 40 and 50 are orthogonal to each other on the entire time axis analogous to the relationship as indicated by the numerical expression 1 or 2.

The second embodiment employs a pair of commercial RF chips or wireless modules used for the generally employed wireless system using the offset QPSK modulation. Simultaneous input of different bit strings to the respective modules from the commercial controller allows radiation of the rotation polarized wave. As a result, the transmitter of the rotation polarized wave may be put to practical use at low costs.

Third Embodiment

A structure of a transmitter according to a third embodiment will be described referring to FIG. 3.

The transmitter according to the third embodiment is different from the transmitter according to the first embodiment as shown in FIG. 1 in a controller 13, instead of the controller 11, which is provided with a CPU 3 and a data bus 4. The other structure is substantially the same as that of the transmitter according to the first embodiment as shown in FIG. 1, and explanation thereof, thus will be omitted.

The CPU 3 sequentially generates the bit strings similar to those generated by the first bit string generator 71 and the second bit string generator 72, and accumulates the bit strings in a first bit string buffer 1 and a second bit string buffer 2, respectively via the data bus 4.

After completion of accumulating the data in both the bit string buffers, the CPU 3 issues a command to simultaneously input contents of the first bit string buffer 1 and the second bit string buffer 2 to the RF circuits 20 and 30, respectively.

The third embodiment allows the CPU to generate a pair of digital data for generation of the rotation polarized wave, and control the timing for transmitting both the digital data to the RF circuits, respectively. This makes it possible to adjust the timing for transmitting the bit strings to be input to the pair of RF circuits, respectively.

Fourth Embodiment

Figure 4:
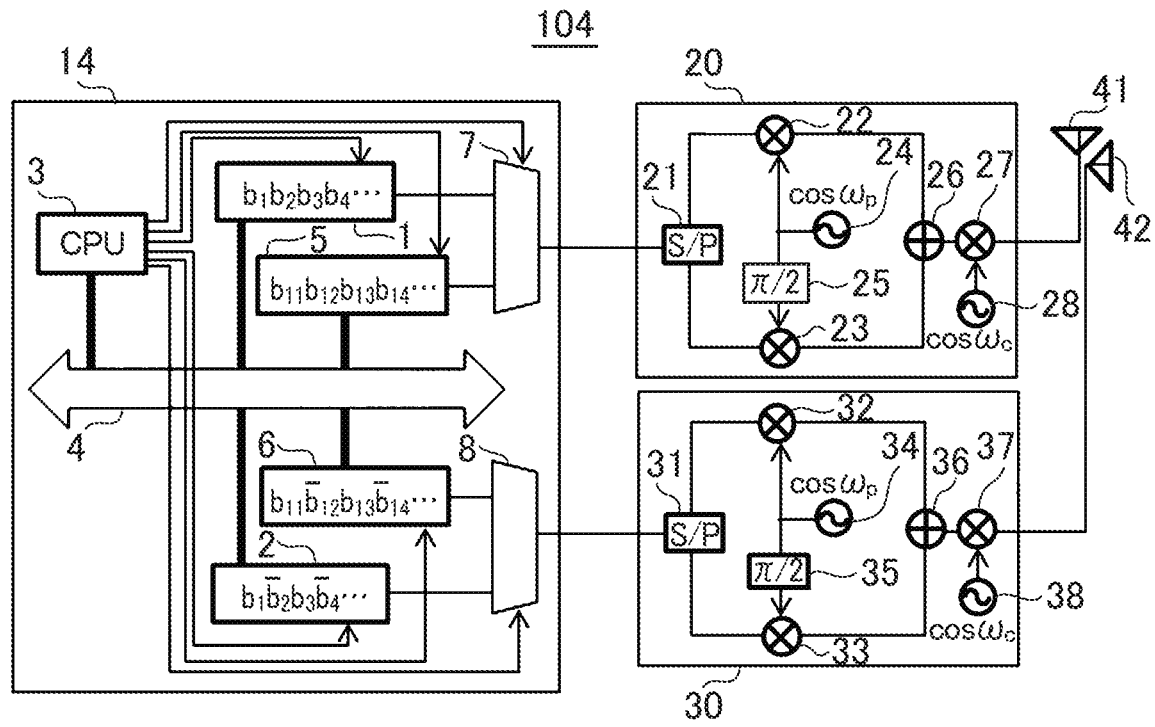
FIG. 4 is a view showing a structure of a transmitter according to a fourth embodiment.

A structure of a transmitter according to a fourth embodiment will be described referring to FIG. 4.

Figure 3:
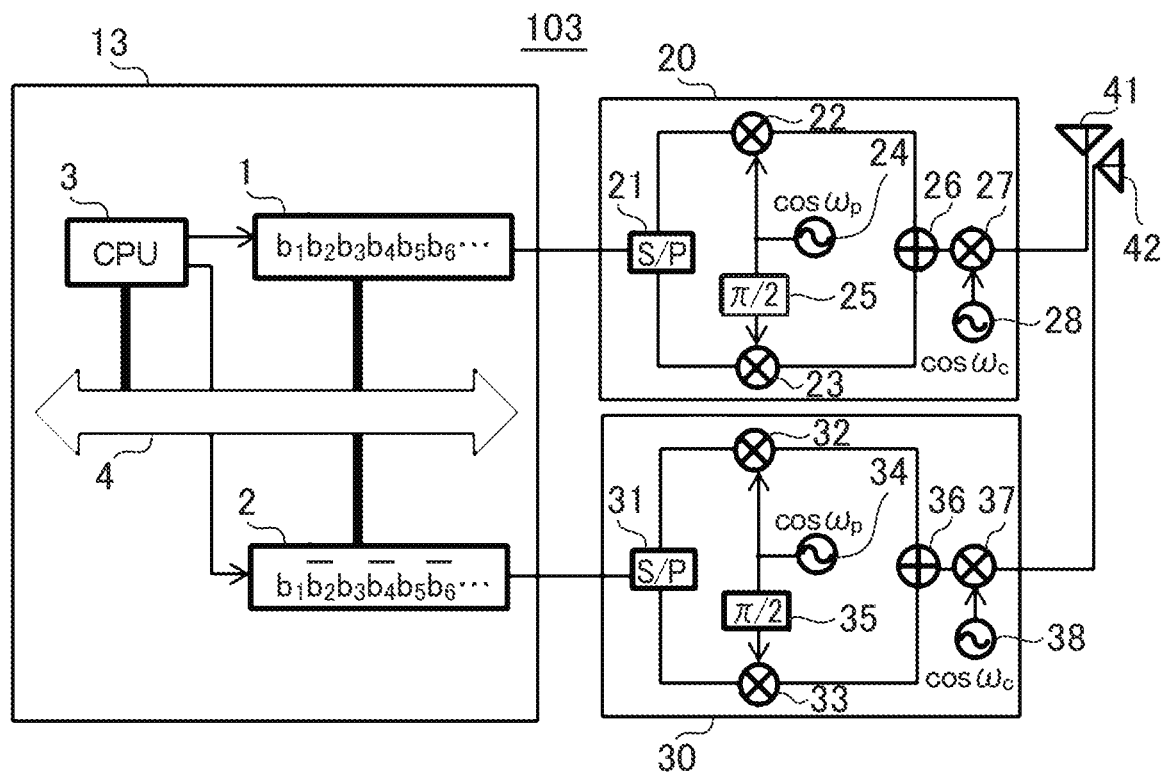
FIG. 3 is a view showing a structure of a transmitter according to a third embodiment.

The transmitter according to the fourth embodiment is different from the transmitter according to the third embodiment as shown in FIG. 3 in a controller 14, instead of the controller 13, which is provided with a third bit string buffer 5, a fourth bit string buffer 6, a first selector 7, and a second selector 8. The other structure is substantially the same as that of the transmitter according to the third embodiment as shown in FIG. 3, and explanation thereof, thus will be omitted.

The next bit string to be accumulated in the first bit string buffer 1 is accumulated in the third bit string buffer 5, and the next bit string to be accumulated in the second bit string buffer 2 is accumulated in the fourth bit string buffer 6 by the CPU 3 via the data bus 4. The first selector 7 switches between the first bit string buffer 1 and the third bit string buffer 5. The second selector 8 switches between the second bit string buffer 2 and the fourth bit string buffer 6. The CPU 3 controls the selectors 7 and 8.

In the fourth embodiment, the digital data to be input to the RF circuit 20 and the RF circuit 30 may be accumulated in the bit string buffers simultaneously with output of those data from the bit string buffer. It is effective for improving the rate of transmitting the information to be transmitted by the transmitter.

Fifth Embodiment

Figure 5:
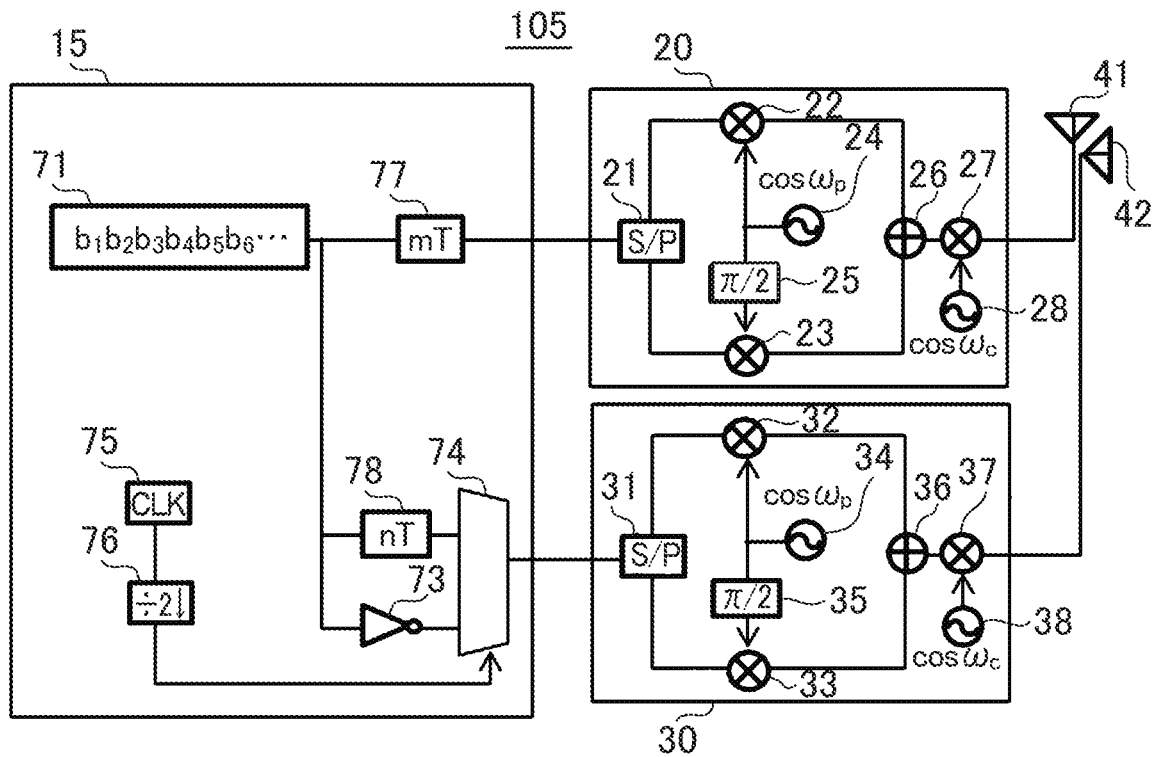
FIG. 5 is a view showing a structure of a transmitter according to a fifth embodiment.

A structure of a transmitter according to a fifth embodiment will be described referring to FIG. 5.

The transmitter according to the fifth embodiment is different from the transmitter according to the first embodiment as shown in FIG. 1 in a controller 15, instead of the controller 11, which is provided with a clock generation circuit 75, a ½ decimeter 76, a first delay circuit 77, a second delay circuit 78, a selector switch 74, and an inverter 73. The other structure is substantially the same as that of the transmitter according to the first embodiment as shown in FIG. 1, and explanation thereof, thus will be omitted.

An output of the first bit string generator 71 is branched into three. The first branch is output to the RF circuit 20 via the first delay circuit 77. The second branch is output to the selector switch 74 via the second delay circuit 78. The third branch is further output to the selector switch 74 via the inverter 73. An output of the clock generation circuit 75 is decimated to two clocks so that the output of the selector switch 74 is switched between the direct output and the inverted output of the first bit string generator 71 for each bit.

A delay amount of the delay circuit 77 is preliminarily determined so that the digital data are simultaneously input to the RF circuits 20 and 30, respectively. A delay amount of the delay circuit 78 is preliminarily adjusted so that the direct input and the inverted input to the selector switch 74 is alternately output continuously.

In the fifth embodiment, as the number of the bit string generators may be reduced, it is effective for reducing the memory size of the transmitter for generating the rotation polarized wave. This makes it possible to reduce the transmitter size as well as the cost.

Sixth Embodiment

A structure of a transmitter according to a sixth embodiment will be described referring to FIGS. 6A and 6B.

The transmitter according to the sixth embodiment is different from the transmitter according to the third embodiment as shown in FIG. 3 in a controller 16, instead of the controller 13, which is provided with a counter 51, a unit bit string buffer 52, an interpolator 53, a first code multiplier 54, a second code multiplier 55, a code selector switch 56, a code table 57, a first diffusion bit string buffer 58, and a second diffusion bit string buffer 59. The other structure is substantially the same as that of the transmitter according to the third embodiment as shown in FIG. 3, and explanation thereof, thus will be omitted.

The CPU 3 generates information bit strings, and sequentially accumulates the data in the first bit string buffer 1. A predetermined number of units of the accumulated bit strings are accumulated in the unit bit string buffer 52 via the counter 51 under the control of the CPU 3 using the value of the counter 51. The bit strings accumulated in the unit bit string buffer 52 are reproduced for each bit by the interpolator 53.

Figure 6A:
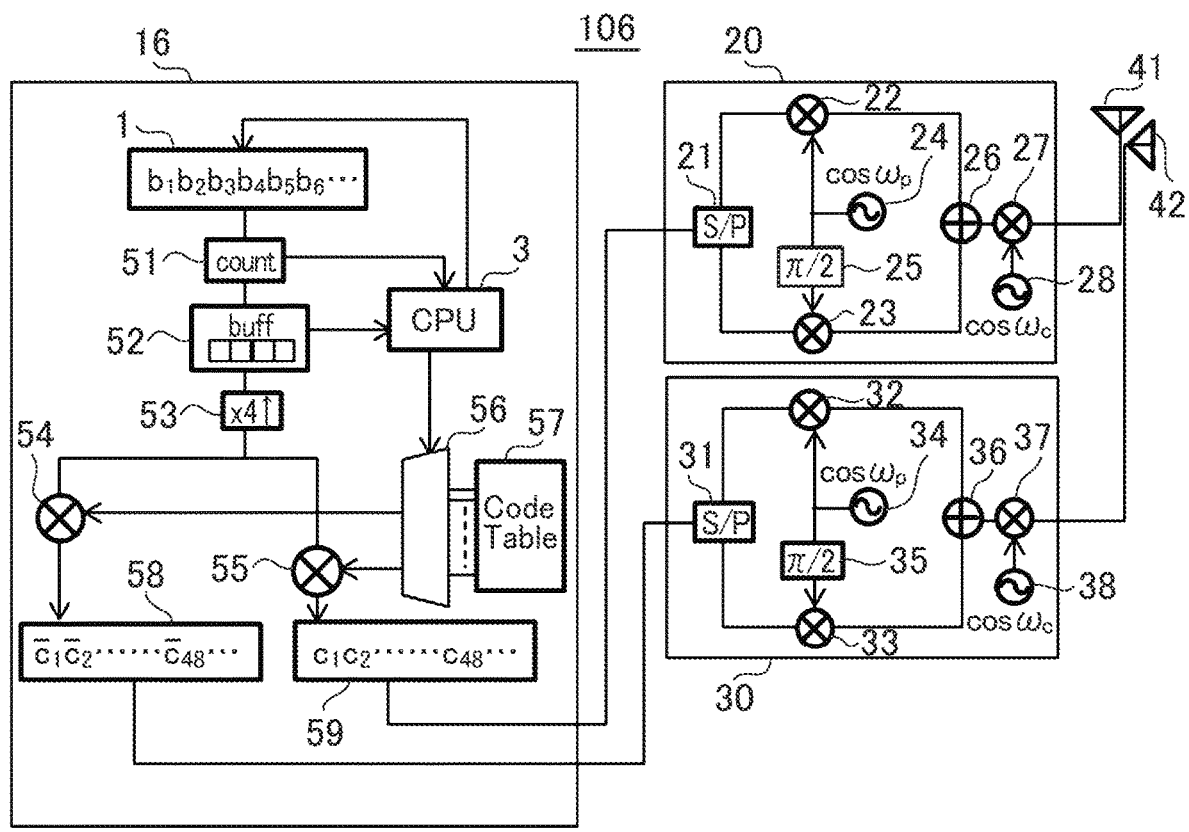
FIG. 6A is a view showing a structure of a transmitter according to a sixth embodiment.
Figure 6B:
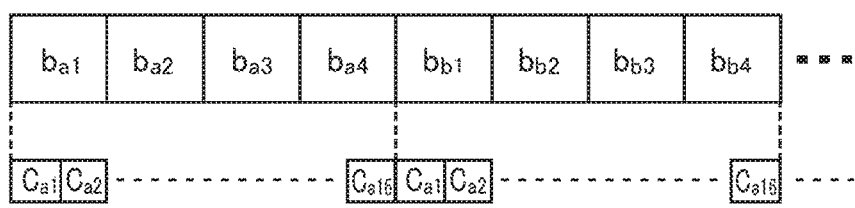
FIG. 6B is a view showing a process that four bits $b_a$ and four bits $b_b$ are reproduced, respectively through interpolation so that the bit string length is enlarged by four times.

FIG. 6B represents extension of the bit string length by four times through reproduction of four bits $b_a$ and four bits $b_b$ by interpolation. The pair of bit strings longer than the unit bit, which have been preliminarily stored in the code table 57 are multiplied using the first code multiplier 54 and the second code multiplier 55. The resultant data are accumulated in the first diffusion bit string buffer 58, and the second diffusion bit string buffer 59.

As FIG. 6B shows, one bit of the extended bit string is allocated to 2-bit code taken from the code table 57. The code table 57 contains a pair of code strings having the odd bit and the inverted even bit. The bit string with the extended information is superposed with the bit string stored in the code table 57 so that the signal diffused with the pair of code strings is accumulated in the first diffusion bit string buffer 58 and the second diffusion bit string buffer 59. The information is diffused as described above.

The bit strings to be accumulated in the first diffusion bit string buffer 58 and the second diffusion bit string buffer 59 are selected so that the odd bits are the same, and the even bits are inverted. The selected data are preliminarily stored in the code table 57. The CPU 3 refers to the unit bit strings accumulated in the unit bit string buffer 52 to select the bit string from the code table 57 by controlling the code selector switch 56. The bit strings accumulated in the first diffusion bit string buffer 58 and the second diffusion bit string buffer 59 are simultaneously input to the RF circuits 20 and 30, respectively. Accordingly, the rotation polarized wave is radiated through the operation similar to the one as described in the embodiment referring to FIG. 3.

In the sixth embodiment, the information signal is diffused with the code having the bit length loner than the original bit length. It is therefore effective for security of information transmission by concealing the information signal.

Seventh Embodiment

A structure of a transmitter according to a seventh embodiment will be described referring to FIG. 7.

The transmitter according to the seventh embodiment is different from the transmitter according to the embodiment as shown in FIG. 6 in a controller 17, instead of the controller 16, which is provided with a second bit string buffer 60, a second counter 61, a second unit bit string buffer 62, a second interpolator 63, a delay circuit 64, and a second code selector switch 66, and a first code selector switch 156. The other structure is substantially the same as that of the transmitter according to the sixth embodiment, and explanation thereof, thus will be omitted.

The CPU 3 generates two different types of information bit strings, and sequentially accumulates the data in the first bit string buffer 1 and the second bit string buffer 60. An operation which relates to the bit strings accumulated in the first bit string buffer 1 is similar to the operation as described in the embodiment as shown in FIG. 6 except the single output from the first code selector switch 156. A predetermined number of units of the bit strings accumulated in the second bit string buffer 60 are accumulated in the second unit bit string buffer 62 via the second counter 61 under the control of the CPU 3 using the value of the second counter 61.

Each single bit of the bit strings accumulated in the second unit bit string buffer 62 is reproduced by the second interpolator 63, and multiplied by the pair of bit strings which are longer than the unit bit string preliminarily stored in the code table 57 using the second code multiplier 55. The resultant data are accumulated in the second diffusion bit string buffer 59.

The respective bit strings to be accumulated in the first diffusion bit string buffer 58 and the second diffusion bit string buffer 59 are selected so that the odd bits are the same, and the even bits are inverted. The data are preliminarily stored in the code table 57. The CPU 3 refers to the unit bit strings accumulated in the unit bit string buffer 52 to select the data from the code table 57 by controlling the first code selector switch 156 and the second code selector switch 66.

A delay amount of the delay circuit 64 is preliminarily adjusted so that the bit strings accumulated in the first diffusion bit string buffer 58 and the second diffusion bit string buffer 59 are simultaneously input to the RF circuits 20 and 30, respectively. Then the rotation polarized wave is radiated through the operation similar to the one as described in the embodiment referring to FIG. 3.

In the seventh embodiment, the information bits to be input to the RF circuits 20 and 30 are obtained through diffusion with codes. The bit strings are generated to have the same odd bits, and the inverted even bits in the same sequence in two systems independent from each other. Finally, the digitally controllable delay circuit is inserted into one of the two signal lines to be input to the two RF circuits. As a result, it is possible to synchronize input of the signals to the two RF circuits.

In the seventh embodiment, it is possible not only to improve generation accuracy of the rotation polarized wave but also simplify the operation of the code selector switch compared with the embodiment as shown in FIG. 6. It is therefore effective for simplifying the CPU control and reducing power consumed by the transmitter.

Eighth Embodiment

A structure of a transmitter according to an eighth embodiment will be described referring to FIG. 8.

Figure 7:
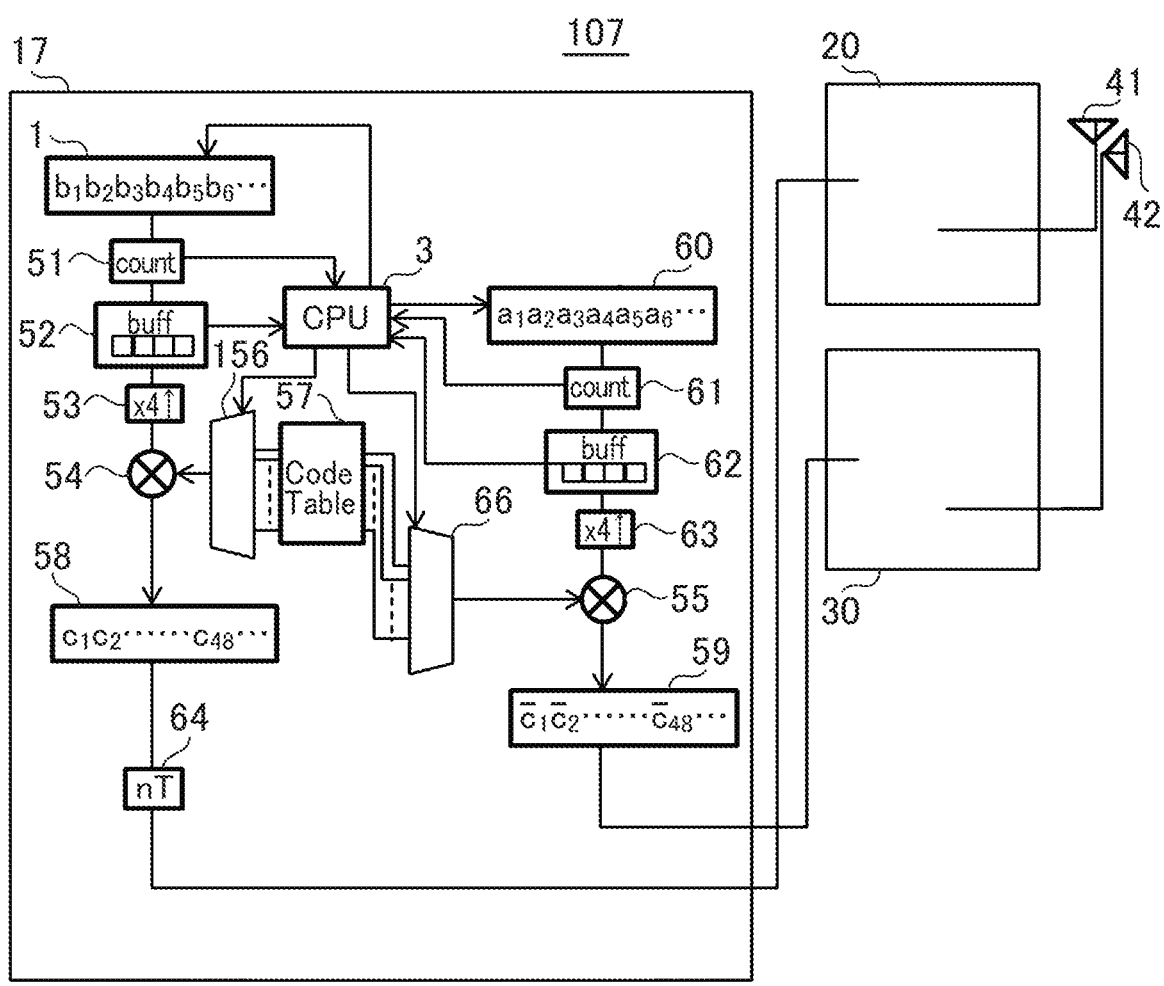
FIG. 7 is a view showing a structure of a transmitter according to a seventh embodiment.

The transmitter according to the eighth embodiment is different from the transmitter according to the seventh embodiment as shown in FIG. 7 in a controller 18, instead of the controller 17, which is provided with a first register 65, a second register 67, and the data bus 4. The other structure is substantially the same as that of the transmitter according to the seventh embodiment, and explanation thereof, thus will be omitted.

Unlike the embodiment as shown in FIGS. 6A and 6B, outputs of the first code multiplier 54 and the second code multiplier 55 are accumulated in the first register 65 and the second register 67, respectively. The data accumulated in the first register 65 and the second register 67 are accumulated in the first diffusion bit string buffer 58 and the second diffusion bit string buffer 59, respectively via the data bus 4 so that the accumulated data are output to the RF circuits 20 and 30, respectively under the control of the CPU 3.

In the eighth embodiment, it is possible to control the timing for transmitting digital data accumulated in the first diffusion bit string buffer 58 and the second diffusion bit string buffer 59 to both the RF circuits, respectively. This allows adjustment of the timing for transmitting the bit strings to be input to the pair of RF circuits.

Ninth Embodiment

Figure 9:
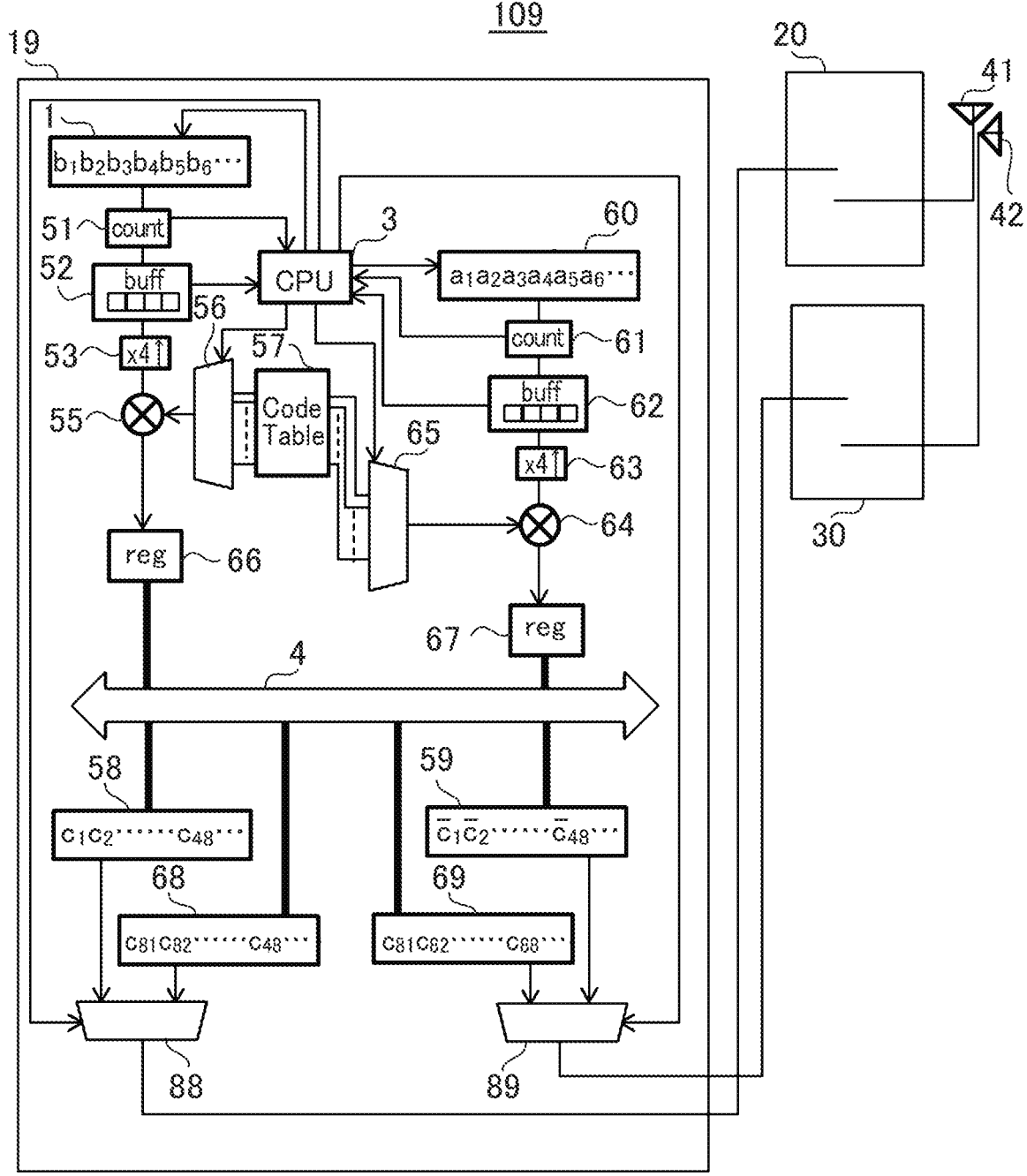
FIG. 9 is a view showing a structure of a transmitter according to a ninth embodiment.

A structure of a transmitter according to a ninth embodiment will be described referring to FIG. 9.

Figure 8:
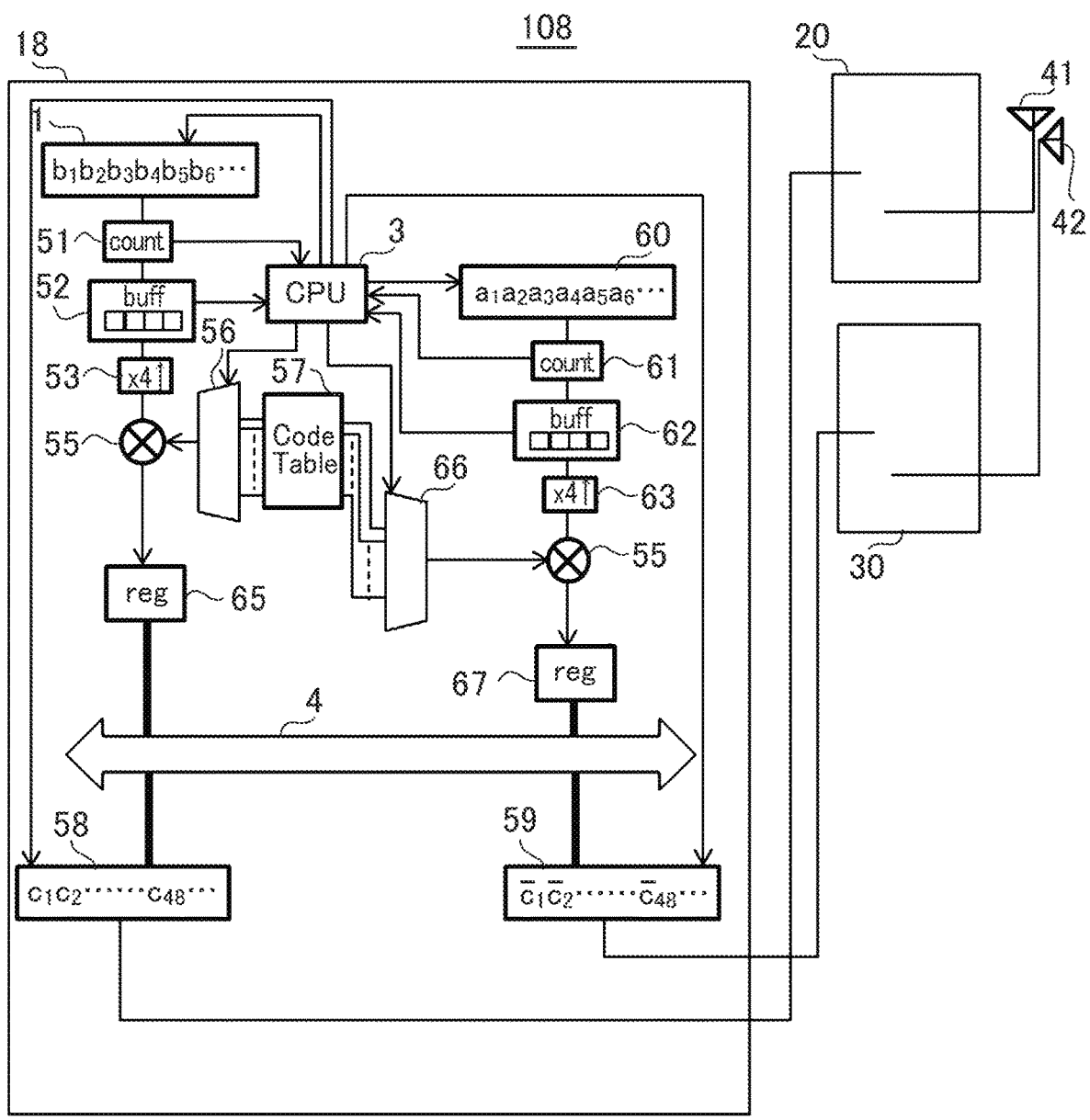
FIG. 8 is a view showing a structure of a transmitter according to an eighth embodiment.

The transmitter according to the ninth embodiment is different from the transmitter according to the eighth embodiment as shown in FIG. 8 in a controller 19, instead of the controller 18, which is provided with a third diffusion bit string buffer 68, a fourth diffusion bit string buffer 69, a first selector 88, and a second selector 89. The other structure is substantially the same as that of the transmitter according to the eighth embodiment, and explanation thereof, thus will be omitted.

The CPU 3 accumulates the next bit string to be accumulated in the first diffusion bit string buffer 58 in the third diffusion bit string buffer 68 via the data bus 4, and the next bit string to be accumulated in the second diffusion bit string buffer 59 in the fourth diffusion bit string buffer 69 via the data bus 4. The first selector 88 switches between the first diffusion bit string buffer 58 and the third diffusion bit string buffer 68. The second selector 89 switches between the second diffusion bit string buffer 59 and the fourth diffusion bit string buffer 69. The CPU 3 controls the selectors 88 and 89.

In the ninth embodiment, it is possible to accumulate the digital data to be input to the RF circuits 20 and 30, respectively in the bit string buffers simultaneously with output of those data from the bit string buffers. It is effective for improving the rate for transmitting the information to be transmitted by the transmitter.

Tenth Embodiment

A structure of a receiver constituting a wireless device according to a tenth embodiment will be described referring to FIG. 10.

Figure 10:
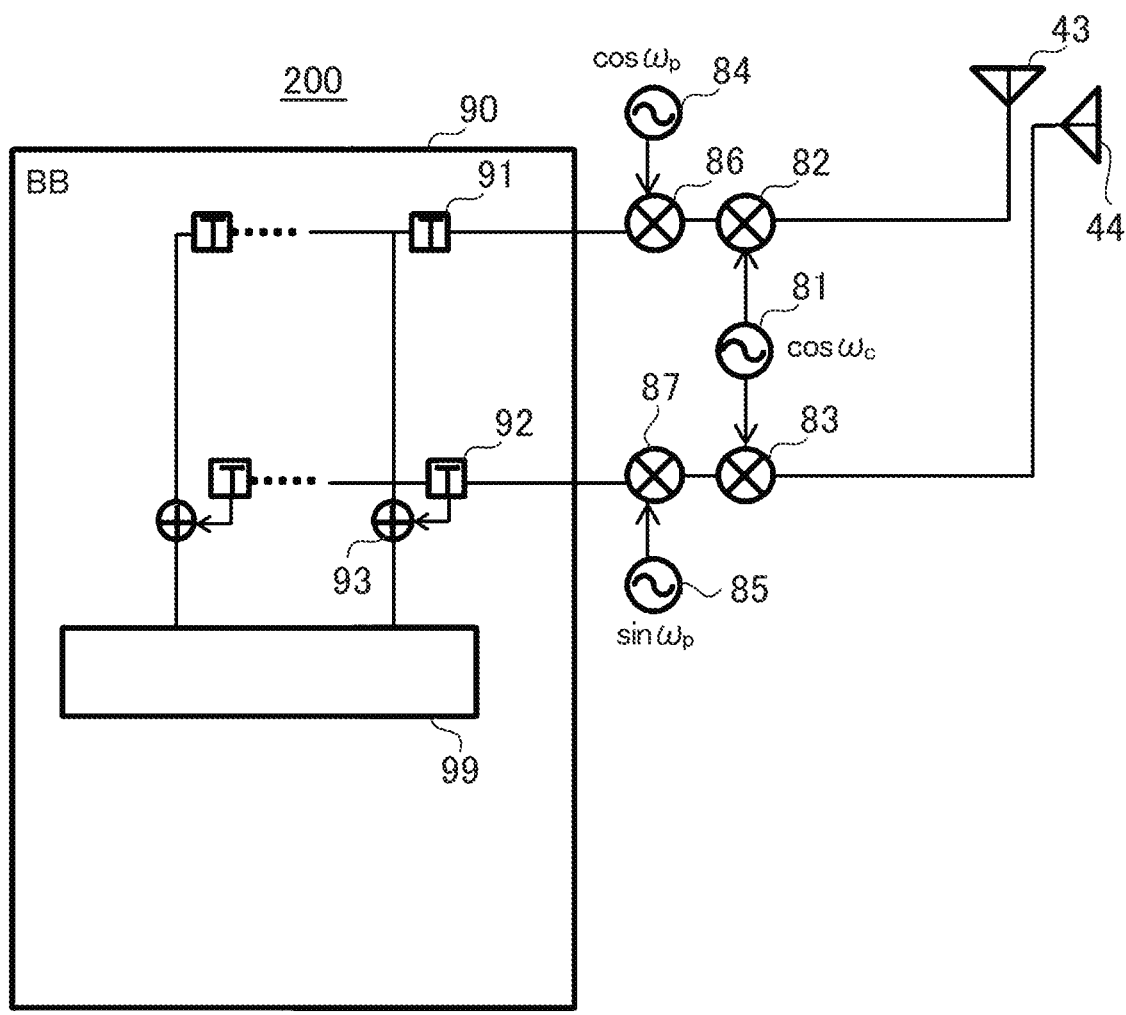
FIG. 10 is a view showing a structure of a receiver constituting a wireless unit according to a tenth embodiment.

As FIG. 10 shows, a receiver 200 which receives the rotation polarized wave from the transmitter for generating the rotation polarized wave includes receiving antennas 43 and 44 which are spatially orthogonal to each other, RF circuit elements, and a baseband circuit 90. Signals input from the first receiving antenna 43 and the second receiving antenna 44 are down-converted into a rotation polarized wave signal with the output of a carrier local generation circuit 81 at the same frequency as the carrier frequency of the transmitter through a first receiving mixer 82 and a second receiving mixer 83.

Outputs from a rotation polarized wave frequency cosine wave generation circuit 84 and a rotation polarized wave frequency sine wave generation circuit 85 are multiplied using a first receiving multiplier circuit 86 and a second receiving multiplier circuit 87, and converted into a baseband signal band. The data are sequentially delayed by a first delay unit group 91 and a second delay unit group 92 each constituted by multiple delay units. The multiple data are input to a baseband signal processing circuit 99.

The receiver according to the tenth embodiment is capable of inputting values corresponding to components of the cosine wave and the sine wave of the rotation polarized wave at the respective timings derived from dividing the single cycle of the rotation polarized wave to the baseband signal processing circuit. This allows the use of the two antennas 43 and 44 spatially orthogonal to each other so as to demodulate the reception signal with respect to the angular components of all polarized waves orthogonal to the advancing direction of the incoming wave.

Eleventh Embodiment

Figure 11:
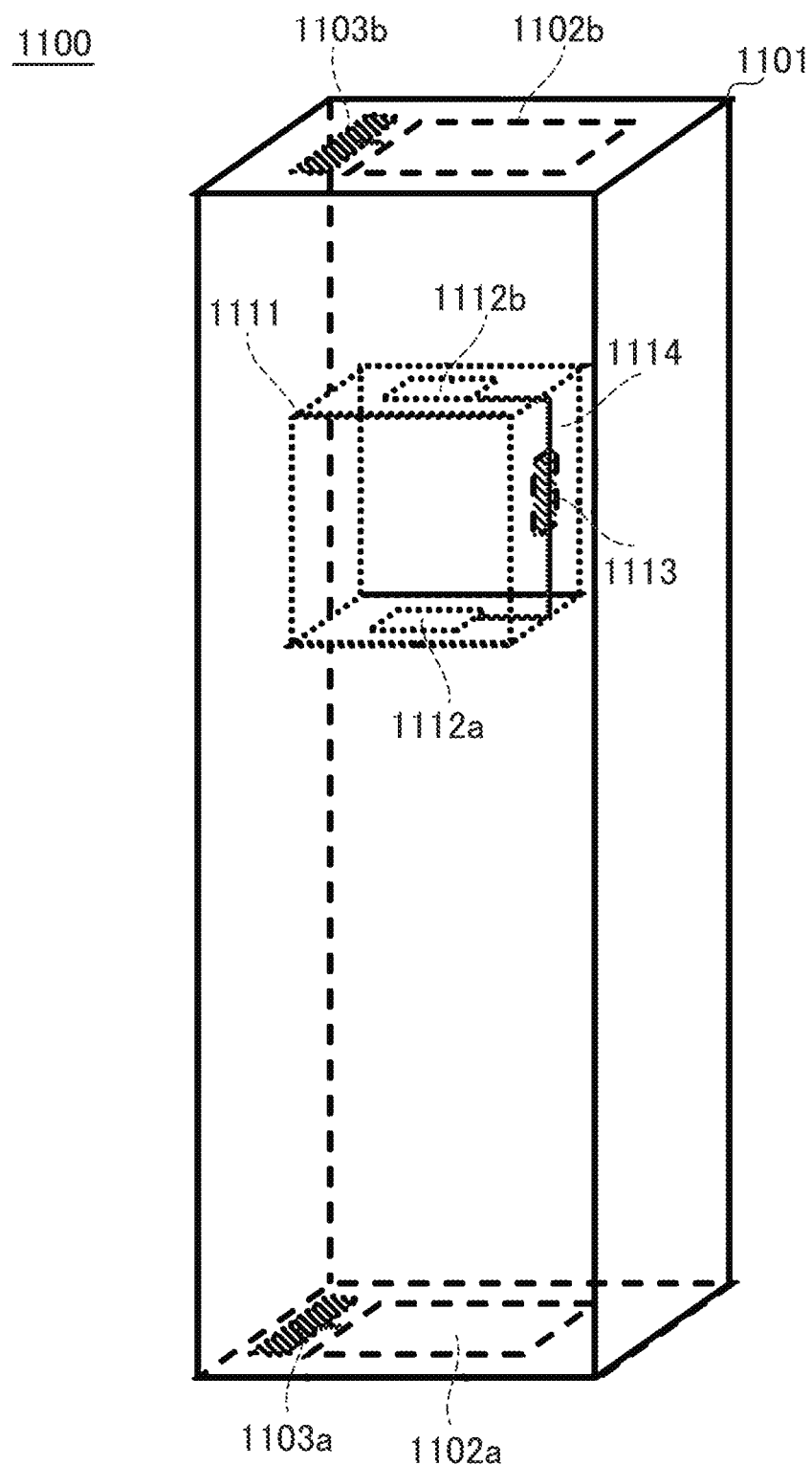
FIG. 11 is a view showing an example of an elevator system to which the transmitter according to the first to the ninth embodiments has been applied.

Referring to FIG. 11, an explanation will be made with respect to application of a wireless system using the rotation polarized wave from the transmitter which generates the rotation polarized wave to an elevator monitoring control system.

An elevator monitoring control system. 1100 according to an eleventh embodiment is configured to move multiple cars 1111 up and down in a building 1101 where the elevator is installed. Combinations of a base station rotation polarized wave wireless device 1103 and a base station 2-orthogonal polarized wave integrated antenna 1102 are disposed on the floor and the ceiling inside the building 1101. Terminal station 2-orthogonal polarized wave integrated antennas 1112 are disposed on an outer ceiling and an outer floor surface of the car 1111, and linked to a wireless terminal 1113 via a high frequency cable 1114.

The inside of the building 1101 serves as a wireless transmission medium for the base station rotation polarized wave wireless device 1103 and the wireless terminal 1113. As the electromagnetic wave receives multiple reflection from the inner wall of the building 1101 and the outer wall of the elevator, the polarized wave differs at a timing when the electromagnetic wave transmitted from multiple wireless terminals 1113 reaches the base station rotation polarized wave wireless unit 1103.

The car will change its relative position. In the case of wireless communication between the base station rotation polarized wave wireless device 1103 and the wireless terminal 1113 when the elevator is stopped, the polarized wave of the electromagnetic wave that reaches the base station rotation polarized wave wireless device 1103 from the multiple wireless terminals 1113 generally fluctuates.

In the eleventh embodiment, within a time period for fixing the relative positions between the base station rotation polarized wave wireless device 1103 and the wireless terminal 1113, the processing for a wireless channel measurement mode and a data transmission mode is executed. This makes it possible to achieve highly reliable wireless communication between the elevator and the fixed rotation polarized wave wireless device in the elevator system having difficulties in predicting the relative fixed position.

The elevator may be remotely controlled and monitored without using the wired connection means in the building 1101. It is therefore possible to eliminate the wired connection means such as cables, and achieve the equivalent transportation capacity in the building with smaller volume.

Alternatively, the transportation capacity may be improved by increasing the dimension of the elevator in the building with the equivalent volume. As the information inside the car 1111 may be sent to the outside by means of the compact and light-weight transmitter with low power consumption, it is possible to reduce the weight of the communication apparatus for information transmission in the car. It is effective not only for saving power consumed by the elevator system but also for reducing maintenance costs for the communication apparatus.

Twelfth Embodiment

Figure 12:
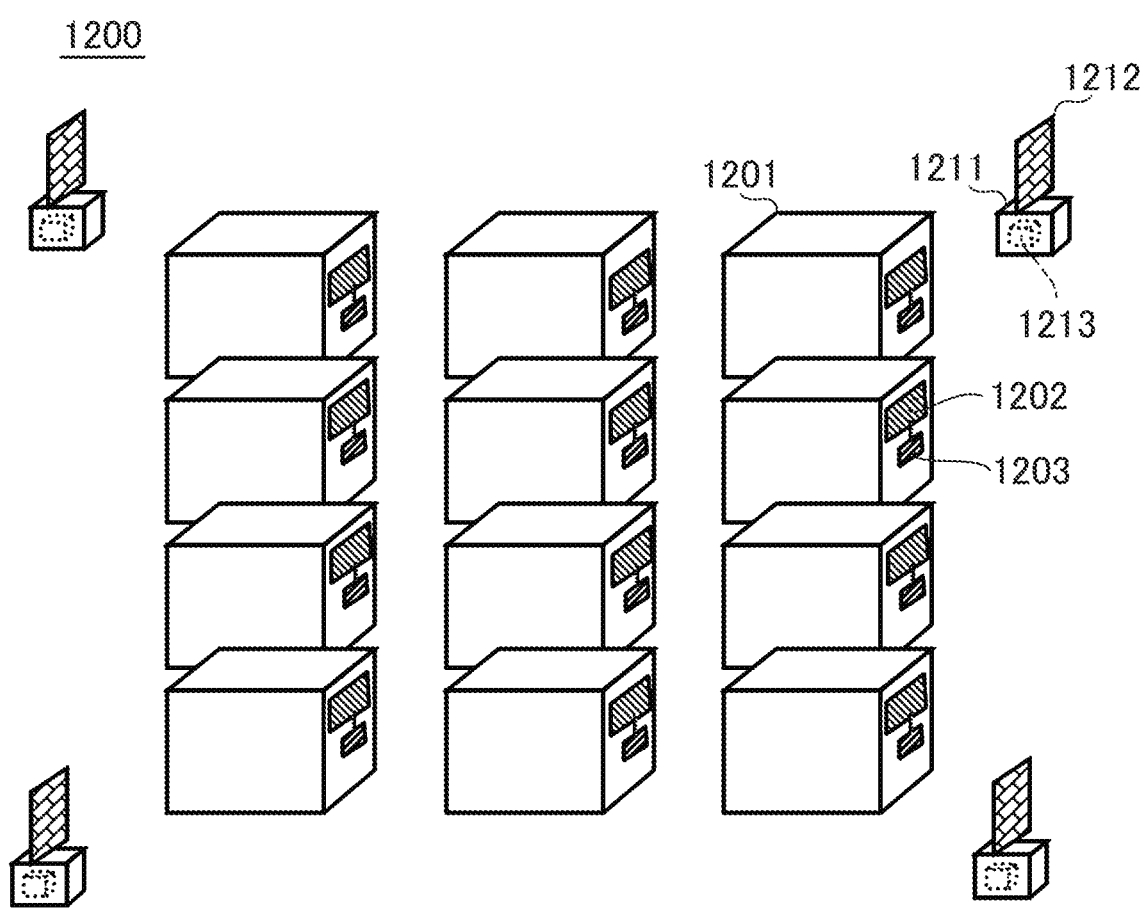
FIG. 12 is a view showing a substation facility monitoring control system to which the transmitter according to the first to the ninth embodiments has been applied.

Referring to FIG. 12, an explanation will be made with respect to application of the wireless system using the rotation polarized wave from the transmitter that generates the rotation polarized wave to a substation facility monitoring control system.

A substation facility monitoring control system 1200 according to a twelfth embodiment includes multiple transformers 1201 each having a combination of a wireless terminal 1203 and a wireless terminal 2-orthogonal polarized wave integrated antenna 1202. A wireless base station 1211 is established near the multiple transformers 1201, and includes a combination of a rotation polarized wave wireless device 1213 for transmitting and receiving the rotation polarized wave according to the present invention, and a rotation polarized wave 2-orthogonal polarized wave integrated antenna 1212.

The transformer is an extremely large with its size in the order of several meters compared with the wavelength which covers the electromagnetic wave frequency of the wireless device in the range from several hundreds of MHz to several GHz. The electromagnetic waves receive multiple reflections from the respective transformers 1201 to form a multiwave interference environment. Then the wave transmitted from the wireless terminals 1203 each fixed in the respective transformers 1201 reaches the rotation polarized wave wireless device 1213 installed in the wireless terminal station 1211 while exhibiting the different polarized waves.

The twelfth embodiment achieves highly reliable wireless communication between the rotation polarized wave wireless device 1213 and the multiple wireless terminals 1203. This makes it possible to remotely control and monitor the transformers 1201 by means of the wireless connection means using the wireless device through the multiple wireless base stations 1211 without using the wired connection means.

The problem of high-pressure dielectric power caused by the use of the wired connection means such as the cable may be solved, which makes it possible to reduce the cable laying cost. It is effective for safety improvement and cost reduction of the system for controlling and monitoring the transformers 1201. Furthermore, it is possible to reduce the cost of the wireless devices to be installed in a large number of transformers 1201. This makes it possible to reduce the cost for introducing the system that wirelessly controls the substation facility monitoring control system 1200.

What is claimed is:

1. A transmitter comprising:
   a first transmission circuit and a second transmission circuit having at least one common circuit; and
   a controller configured to:
   generate first digital data and
   output the first digital data to the first transmission circuit, and
   generate second digital data different from the first digital data and
   output the second digital data to the second transmission circuit, wherein a pair of antennas are arranged to transmit outputs of the first transmission circuit and the second transmission circuit, the pair of antennas spatially orthogonal to each other, to generate a radio wave having a polarized wave rotating orthogonally to a propagation direction,
   wherein the controller is configured to generate digital data as the second digital data, having a part cyclically different from the first digital data,
   the controller is configured to generate the first digital data and the second digital data, having sequential bit strings as the digital data in which mutually coincident bits and inverted bits are alternately arranged repeatedly for every other bit.

2. The transmitter according to claim 1, wherein the first transmission circuit and the second transmission circuit include the same modulators and the same frequency up-converters each as part of the common circuit.

3. The transmitter according to claim 2, wherein the modulator executes Quadrature Phase Shift Keying (QPSK) modulation or offset QPSK modulation.

4. The transmitter according to claim 1, wherein the controller is configured to generate the digital data as the second digital data, having a part different from the first digital data and a part that is the same as the first digital data, the parts being equivalent with respect to time in the cycle.

5. The transmitter according to claim 1, wherein the controller is configured to output the first digital data and the second digital data simultaneously to the first transmission circuit and the second transmission circuit, respectively.

6. The transmitter according to claim 1, wherein:
   the controller is configured to store the first digital data and the second digital data in a pair of signal buffers formed in a digital circuit including a signal processing circuit; and
   the controller is configured to output the digital data simultaneously to the first transmission circuit and the second transmission circuit, respectively under the control of the signal processing circuit.

7. The transmitter according to claim 6, wherein:
   the digital circuit including the signal processing circuit forms a pair of signal buffer groups including a plurality of signal buffers; and
   the digital circuit is configured to execute an operation of outputting the digital data from one buffer among the signal buffer groups simultaneously with an operation of accumulating the digital data in another buffer under the control of the signal processing circuit.

8. The transmitter according to claim 1, wherein the controller is configured to output the digital data derived from diffusing one information signal with two cyclically and partially different codes as the first digital data and the second digital data to the first transmission circuit and the second transmission circuit, respectively.

9. The transmitter according to claim 8, wherein the controller is configured to divide sequential bit strings including the information signal into unit bit groups each with a fixed number of bits, and output a pair of different signals derived from diffusing the unit bit groups with partially different pair of codes to the first transmission circuit and the second transmission circuit as the first digital data and the second digital data, respectively.

10. A transmitter comprising:
a first transmission circuit and a second transmission circuit having at least one common circuit; and
a controller configured to:
generate first digital data and
output the first digital data to the first transmission circuit, and
generate second digital data different from the first digital data and
output the second digital data to the second transmission circuit, wherein a pair of antennas are arranged to transmit outputs of the first transmission circuit and the second transmission circuit, the pair of antennas spatially orthogonal to each other, to generate a radio wave having a polarized wave rotating orthogonally to a propagation direction,
wherein:
the controller is configure to divide each of a pair of sequential bit strings including an information signal into unit bit groups each with a fixed number of bits; and
the controller is configured to output a pair of different signals derived from diffusing the respective unit bit groups with partially different pair of codes to the first transmission circuit and the second transmission circuit as the first digital data and the second digital data, respectively via a delay circuit.

11. A wireless device comprising:
the transmitter according to claim 1; and
a receiver configured to receive two-line baseband signals derived from multiplying a down-converted signals received from a pair of antennas spatially orthogonal to each other by a cosine wave and a sine wave of a polarized wave rotation frequency, respectively.

12. An elevator monitoring control system remotely monitoring and controlling an elevator from a building using the wireless device according to claim 11.

13. A substation facility monitoring control system remotely monitoring and controlling a substation from a wireless base station using the wireless device according to claim 11.

14. A transmitter comprising:
a first transmission circuit and a second transmission circuit having at least one common circuit; and
a controller configured to:
generate first digital data, a plurality of first bits being arranged sequentially in the first digital data, and
output the first digital data to the first transmission circuit, and
generate second digital data different from the first digital data, a plurality of second bits being arranged sequentially in the second digital data, and
output the second digital data to the second transmission circuit, wherein a pair or antennas is arranged to transmit outputs of the first transmission circuit and the second transmission circuit, the pair of antennas spatially orthogonal to each other, to generate a radio wave having a polarized wave rotating orthogonally to a propagation direction,
wherein the controller is further configured to generate digital data as the second digital data, having a part cyclically different from the first digital data,
wherein the plurality of second bits are partially inverted by inverting the corresponding first bits,
wherein a total number of the second bits is equal to a total number of the first bits.

15. The transmitter according to claim 14, wherein the first transmission circuit and the second transmission circuit include the same modulators and the same frequency up-converters each as part of the common circuit.

16. The transmitter according to claim 14, wherein the controller is configured to output the first digital data and the second digital data simultaneously to the first transmission circuit and the second transmission circuit, respectively.

17. The transmitter according to claim 1, wherein:
the controller is configured to store the first digital data and the second digital data in a pair of signal buffers formed in a digital circuit including a signal processing circuit; and
the controller configured to output the digital data simultaneously to the first transmission circuit and the second transmission circuit, respectively under the control of the signal processing circuit.

18. The transmitter according to claim 17, wherein:
the digital circuit including the signal processing circuit forms a pair of signal buffer groups including a plurality of signal buffers; and
the digital circuit is configured to execute an operation of outputting the digital data from one buffer among the signal buffer groups simultaneously with an operation of accumulating the digital data in another buffer under the control of the signal processing circuit.

19. The transmitter according to claim 14, wherein the controller is configured to output the digital data derived from diffusing one information signal with two cyclically and partially different codes as the first digital data and the second digital data to the first transmission circuit and the second transmission circuit, respectively.

20. The transmitter according to claim 19, wherein the controller is configured to divide sequential bit strings including the information signal into unit bit groups each with a fixed number of bits, and output a pair of different signals derived from diffusing the unit bit groups with partially different pair of codes to the first transmission circuit and the second transmission circuit as the first digital data and the second digital data, respectively.

* * * * *